(12) United States Patent
Uneme et al.

(10) Patent No.: US 6,381,809 B2
(45) Date of Patent: May 7, 2002

(54) FRICTIONAL HINGE DEVICE AND A PORTABLE BUSINESS MACHINE INTO WHICH THE FRICTIONAL HINGE DEVICE IS INCORPORATED

(75) Inventors: Masato Uneme; Takaaki Hayashida, both of Nagoya (JP)

(73) Assignee: Chuo Hatsujo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/761,653

(22) Filed: Jan. 18, 2001

(30) Foreign Application Priority Data

Jan. 18, 2000 (JP) ......................................... 2000-008493

(51) Int. Cl.[7] ............................................... E05D 11/08
(52) U.S. Cl. ............................. 16/342; 16/337; 16/385; 16/386; 361/681
(58) Field of Search .......................... 16/342, 337, 340, 16/347, 225, 385, 386, 387, DIG. 13; 361/680, 681, 682; 248/920–922; 264/513, 515, 510, 523, 531, 534, 535, 540

(56) References Cited

U.S. PATENT DOCUMENTS

| | | | |
|---|---|---|---|
| 5,018,244 A | * | 5/1991 | Hino ........................... 16/337 |
| 5,566,048 A | * | 10/1996 | Esterberg et al. ............. 16/307 |
| 5,752,293 A | * | 5/1998 | Lowry et al. .................. 16/337 |
| 5,832,566 A | * | 11/1998 | Quek et al. .................... 16/342 |

FOREIGN PATENT DOCUMENTS

| | | | |
|---|---|---|---|
| JP | 86766 | * | 4/1993 |
| JP | 154864 | * | 6/1993 |
| JP | 7-26825 | | 1/1995 |
| JP | 325051 | * | 11/1999 |
| JP | 248815 | * | 9/2000 |

* cited by examiner

Primary Examiner—Chuck Y. Mah
(74) Attorney, Agent, or Firm—Morgan, Lewis & Bockius LLP

(57) ABSTRACT

In a frictional hinge device, an inequable strain distribution within a synthetic resin is determined to be 15% or less so as to increase a torque holding rate by 80% or more to tightly engage a support block 20 with a metallic shaft 10. This eliminates variations on a frictional torque with no substantial stickslip phenomenon, abnormal noise and initial scratches accompanied when pivotally moving the support block 20 relative to the metallic shaft 10 so as to maintain a stable surface friction resistance with good endurance for a long period of time.

7 Claims, 11 Drawing Sheets

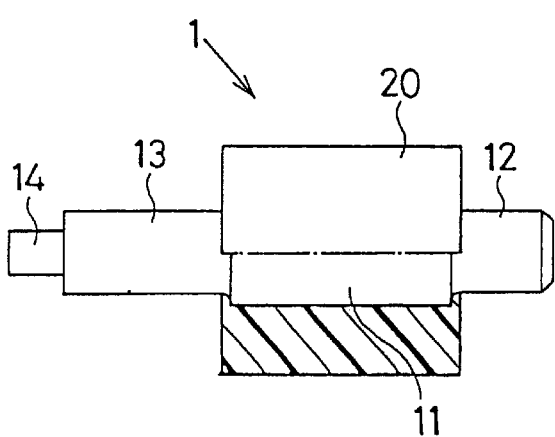
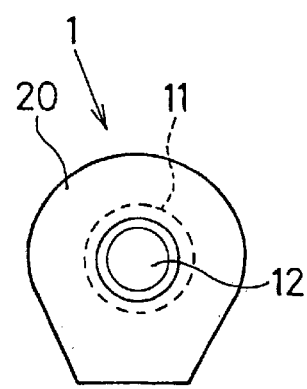
Fig. 3
Fig. 3a

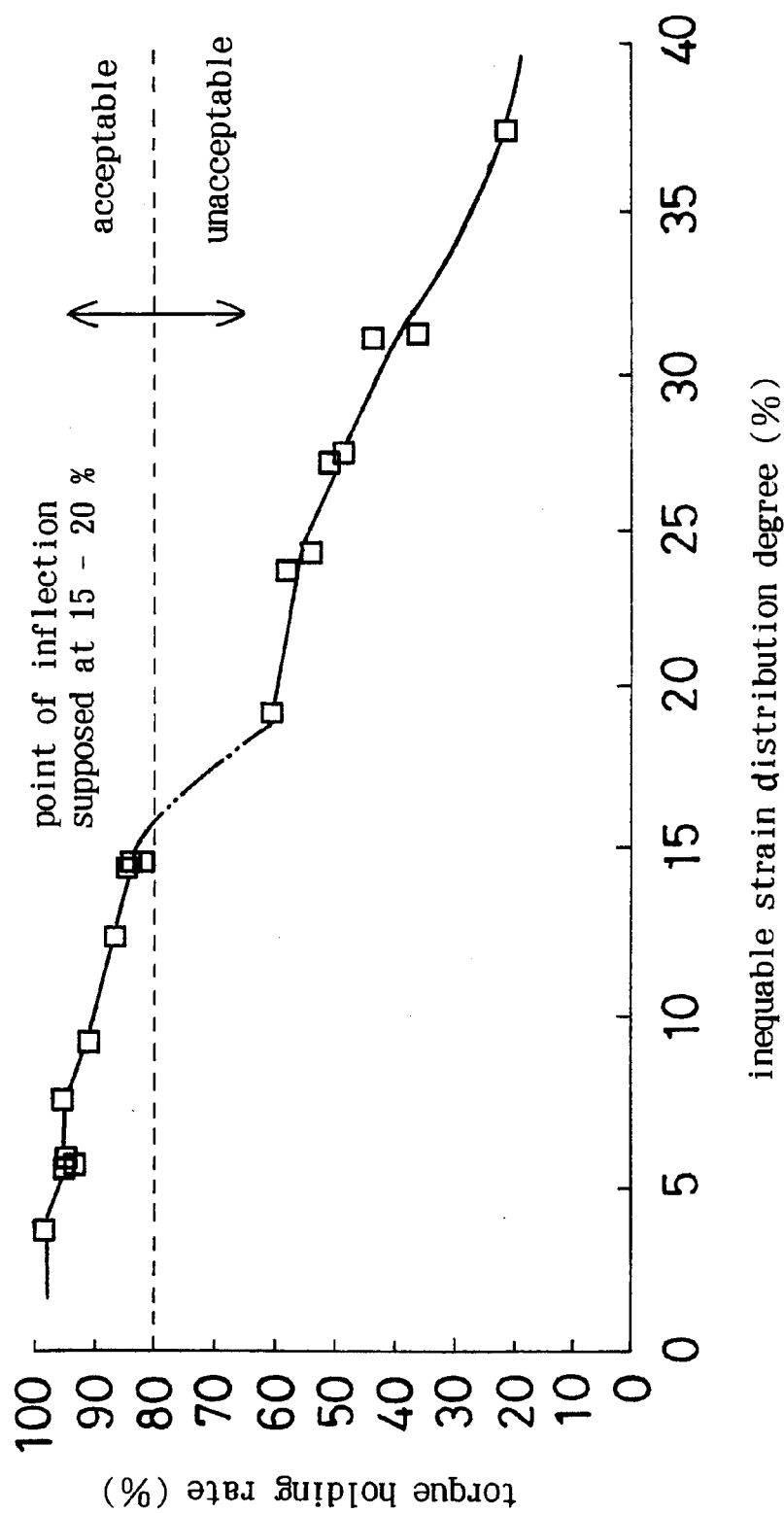

stress-strain curve at 23 °C

FRICTIONAL HINGE DEVICE AND A PORTABLE BUSINESS MACHINE INTO WHICH THE FRICTIONAL HINGE DEVICE IS INCORPORATED

BACKGROUND OF THE INVENTION

1. Field of the Invention

The invention relates to a frictional hinge device used to pivotably support various lid plates at desired angular positions including opening and closing positions, and concerns to a portable business machine such as a laptop note type personal computer into which the frictional hinge device is incorporated to hold a display at the desired angular positions.

2. Description of Prior Art

In this type of the frictional hinge device, a lid plate is secured to a metallic shaft which is pivotally supported on a holder block metal. The holder block metal clamps the metallic shaft to produce a surface frictional resistance between the holder block metal and the metallic shaft so as to hold the lid plate at desired angular positions.

Although this makes a whole structure simple and contributes to cost reduction, a certain quantity of grease is required for lubrication between the holder block metal and the metallic shaft. The grease becomes a likely cause of perimetric pollution around the frictional hinge device.

In order to avoid these inconveniences, a shaft lock device is disclosed by Laid-open Japanese Patent Application No. 7-26825 (laid-open on Jan. 27, 1995, assigned to Kabushiki Kaisha Kato Spring Seisakusho). This laid-open publication teaches that an outer shaft is made of a synthetic resin and integrally molded with an inner shaft. Due to a surface frictional resistance caused from a thermal expansional difference between the inner and outer shafts, the inner shaft is held at any desired angular positions while permitting the inner shaft to pivot relative to the outer shaft against the force of the surface frictional resistance therebetween. Due to the surface frictional resistance, a display is held at the desired angular positions in a laptop note type personal computer.

In the shaft lock device disclosed by the Laid-open Japanese Patent Application No. 7-26825, providing a surface roughness, surface treatment and frictional coefficient are suggested as means to determine the frictional torque between the inner and outer shafts together with their diametrical dimensions.

However, this disclosure remains silent about qualitative and quantitative analyses on a relationship between the inner and outer shafts. This causes no smaller variations on the frictional torque when the inner shaft pivotally moves relative to the outer shaft. This also causes abnormal noise due to a stickslip phenomenon when pivotally moving the inner shaft, thereby losing a good endurance with a reduced frictional torque due to an unacceptable amount of wear between the inner and outer shafts.

Therefore, the present invention has been made with the above drawbacks in mind.

It is a main object of the invention to provide a frictional hinge device which is inexpensive with no fear for perimetric grease pollution and no abnormal noise accompanied with a stickslip phenomenon with the least torque variations, and is capable of maintaining a stable surface frictional resistance between a shaft member and a support member for an extended period of time so as to repeatedly hold the support member at desired angular positions based on a substantially uniform surface frictional resistance.

SUMMARY OF THE INVENTION

With a frictional hinge device having a support member rotatably supported by a shaft member, a support member is integrally molded around the shaft member when a synthetic resin is injected into a mold die in which the shaft member is placed beforehand.

Due to the synthetic resin contracted by a residual stress caused from a shrinkage allowance when solidified, the support member tightly engages with the shaft member. This provides a good surface frictional resistance therebetween. When the support member is subjected to a frictional torque greater than the surface frictional resistance, the support member pivots around the shaft member relatively. When the support member is subjected to a frictional torque less than the surface frictional resistance, the support member is held at an appropriate angular position by the surface frictional resistance.

With the synthetic resin molded around the shaft member, the support member and the shaft member are assembled quickly with the least manufacturing cost.

Thus, the support member tightly engages with the shaft member due to the synthetic resin contracted by the residual stress caused from the shrinkage allowance when solidified, and a strain appears within the synthetic resin of the support member in correspondence to the residual stress.

The inventors carried out experimental tests by paying their attention to a relationship between a strain distribution and a torque holding rate. As a result, the inventors found that the torque holding rate falls rapidly to deteriorate the endurance when the strain distribution comes inequable such a degree as to exceed 15% (referred to as "inequable strain distribution degree" hereinafter).

The torque holding rate T (%) is expressed by the formula below.

$T\ (\%)$=(a torque measured after undergoing a heat deteriorating experimental test or an endurance experimental test)×100/(an initial torque)

The strain distribution within the synthetic resin is equalized so that the inequable strain distribution degree is 15% or less. Where the inequable strain distribution degree (%) is expressed by (|maximum strain (minimum strain)−average strain|)×100/(average strain) in which a greater one is selected when compared the absolute value |maximum strain| with the absolute value |minimum strain|.

In order to realize these requirements, the support member is quality controlled based on a molding method, configuration, post-treatment and molding conditions to produce a frictional hinge device superior in endurance.

With the high and stable torque holding rate thus achieved, a smoothness is imparted to the shaft member to avoid an unfavorable coagulation against the synthetic resin to obtain an appropriate frictional resistance between the shaft member and synthetic resin. This also reduces frictional torque variations and a stickslip phenomenon significantly with no abnormal noise induced due to the stickslip phenomenon when the support member pivots relative to the shaft member.

In order to equalize the strain distribution within the synthetic resin, the synthetic resin is partly thickened or partly thinned.

In order to also equalize the strain distribution within the synthetic resin, a film injection gate or a multiple point injection gate is provided, the former of which flows the synthetic resin smoothly and the latter of which flows the synthetic resin dispersively when the synthetic resin is molded around the shaft member.

In order to further equalize the strain distribution within the synthetic resin, the synthetic resin is dealt with a heat treatment at a temperature of 0.8×Tg (°C.) or higher after the synthetic resin is molded around the shaft member. Where Tg (°C.) is a vitreous transformation temperature when the synthetic resin metamorphoses into a rubberized property.

In order to furthermore equalize the strain distribution in the synthetic resin, an equable control means is provided to determine mold conditions so as to equally flow the synthetic resin around the shaft member.

With at least two means combined among (a)~(e) below, the strain distribution within the synthetic resin is synergistically equalized.
(a) partly thickening or thinning the synthetic resin,
(b) providing the film injection gate,
(c) providing the multiple point injection gate,
(d) dealing with the heat treatment at temperatures of 0.8×Tg (°C.) or higher, and
(e) determining molding conditions to equally flowing the synthetic resin around the shaft member due to the equable control means.

With the frictional hinge device used to pivotably move a display for a portable business machine, it is possible to hold the display repeatedly at any desired angular position for an extended period of time while insuring a stable frictional torque with the least amount of wear between the shaft member and the support member.

BRIEF DESCRIPTION OF THE DRAWINGS

Preferred forms of the present invention are illustrated in the accompanying drawings in which:

FIG. 3 is a plan view of the frictional hinge device but partly sectioned;

FIG. 3a is a side elevational view of the frictional hinge device;

FIG. 6 is a graphical representation showing how a relationship between the inequable strain distribution degree and a torque holding rate;

DETAILED DESCRIPTION OF THE PREFERRED EMBODIMENTS

Figure 1:
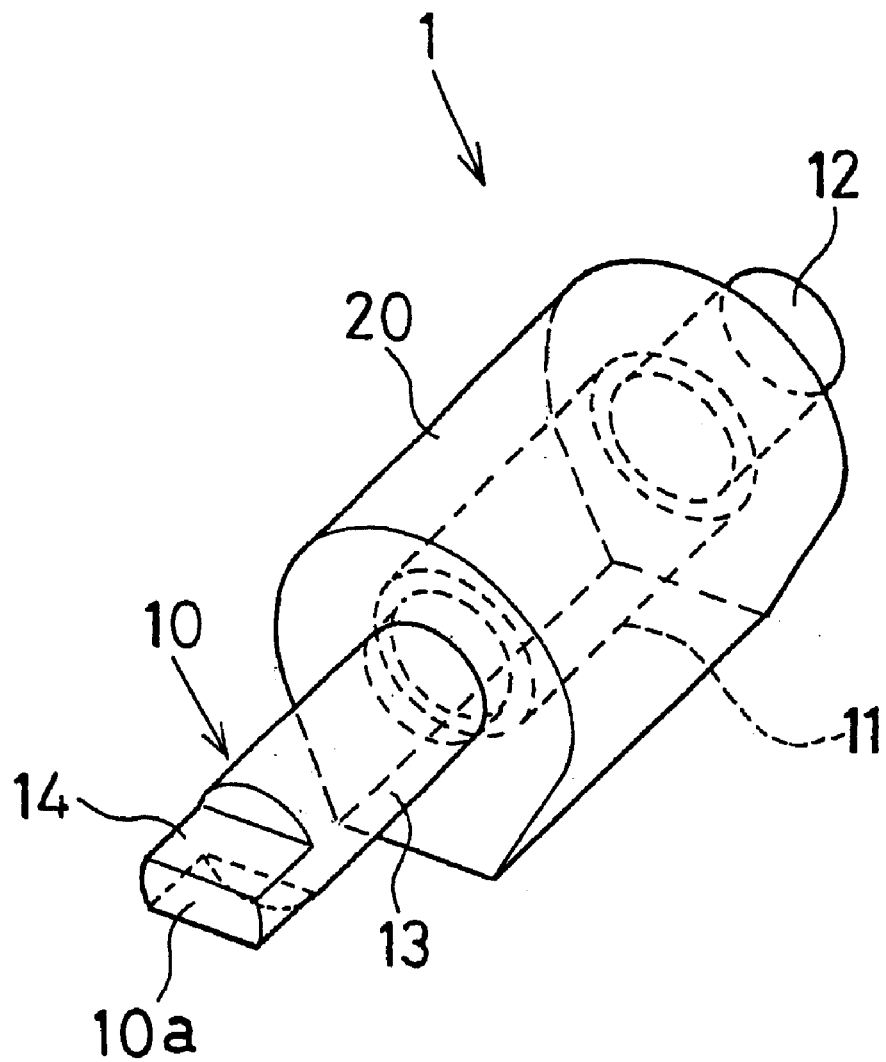
FIG. 1 is a perspective view of the frictional hinge device.
Figure 2:
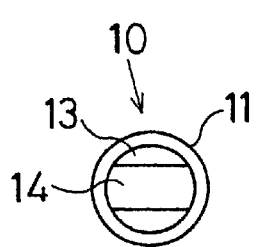
FIG. 2 is a side elevational view of a metallic shaft of the frictional hinge device.
Figure 2A:
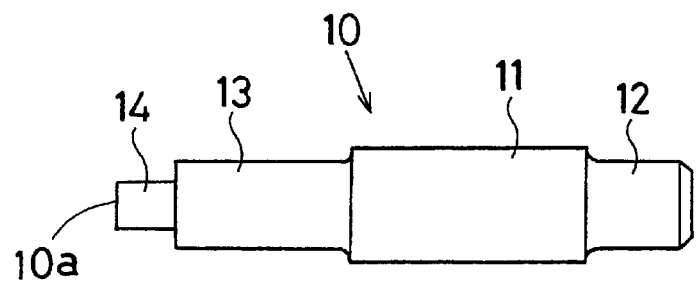
FIG. 2a is a plan view of the metallic shaft of the frictional hinge device.
Figure 4:
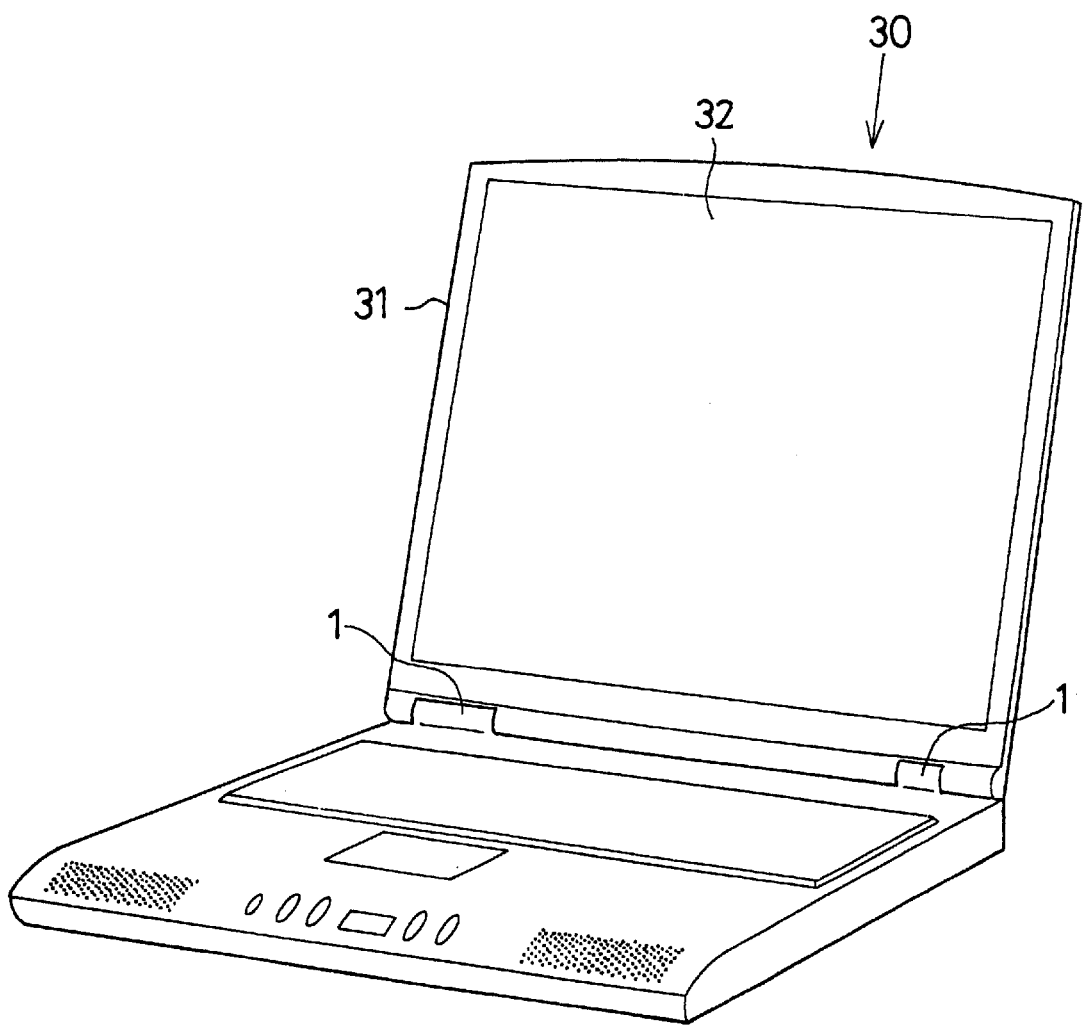
FIG. 4 is a perspective view of a laptop note type personal computer into which the frictional hinge device is incorporated as a business machine.

Referring to FIGS. 1 and 4, a frictional hinge device 1 is incorporated into a laptop note type personal computer 30 (portable business machine) to pivotally move a lid plate 31 on which a liquid crystal display 32 is mounted. The lid plate 31 is adjusted at any desired angular positions to insure a good view on the liquid crystal display 32.

The frictional hinge device 1 has a metallic shaft (shaft member) 10 which serves as a rotational axis of a rotational center 10a. The metallic shaft 10 is secured to the lid plate 31 of the personal computer 30 to pivotally move in unison with the lid plate 31. A support block (support member) 20 is provided to pivotably support the metallic shaft 10 relative to the support block 20. In this instance, the support block 20 may be secured to the lid plate 31, and metallic shaft 10 secured to a main body of the personal computer 30.

As shown in FIGS. 2, 2a, 3 and 3a, the metallic shaft 10 is made from an age-hardened stainless steel (SUS), a mild steel, or a high Si containing aluminum-based alloy in order to form a columnar configuration. The metallic shaft 10 has a diameter-increased section 11 (e.g., 5 mm in diameter) at a middle portion and diameter-reduced sections 12, 13 (e.g., 4 mm in diameter) at right and left end portions respectively. The left ended diameter-reduced section 13 has a dowel 14 to connectedly interfit into the lid plate 31.

On the other hand, the support block 20 is formed by a synthetic resin (e.g., PAR: acronymized from polyarylate) which tightly engages with an outer surface of the diameter-increased section 11 of the metallic shaft 10 as shown in FIGS. 3 and 3a. In this instance, the synthetic resin pellets are injected into a mold die in which the metallic shaft 10 had been placed beforehand.

At a time when molding the synthetic resin around the metallic shaft 10, the mold die is preheated to approx. 165° C. This produces a predetermined quantity of a surface friction resistance between the support block 20 and the metallic shaft 10 due to a residual stress caused from a shrinkage allowance appeared when the synthetic resin is solidified.

The frictional hinge device 1 holds the lid plate 31 at any angular positions in relation to the main body of the personal computer 30. For this reason, it is necessary to adjust the frictional torque between the metallic shaft 10 and the support block 20 when the torque is less than a predetermined value. While it is necessary to provide a smooth pivotal movement with the metallic shaft 10 when the frictional torque is greater than the predetermined value.

An attention was focused on a strain distribution within the synthetic resin of the support block 20 in correspondence to a residual stress established therein. As shown in FIGS. 5a and 5b, three columns of strain gauge pieces are attached to an outer surface of the support block 20 in a circumferential direction so as to measure strains at places denoted by ①, ② and ③.

Figure 5:
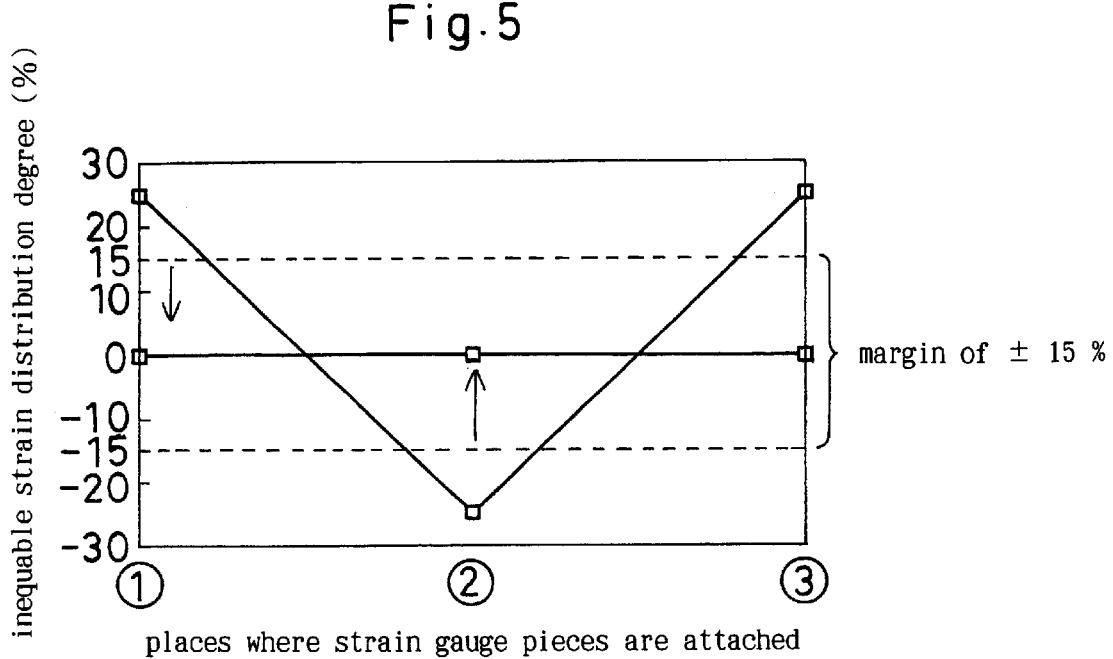
FIG. 5 is a graphical representation showing how an inequable strain distribution degree changes depending on where a strain gauge is attached.
Figure 5A:
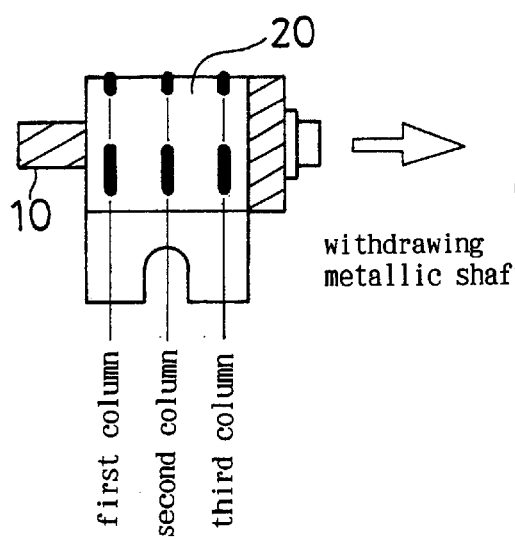
FIG. 5a is a plan view of a support block showing where the strain gauge is attached when a tensile experimental test is implemented to seek a strain distribution.
Figure 5B:
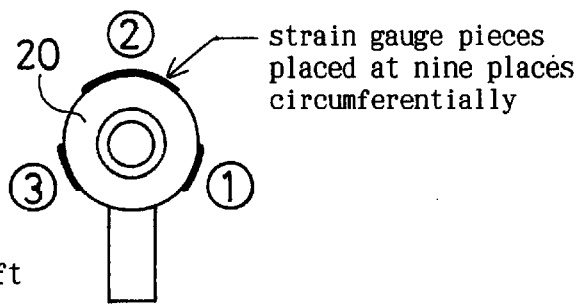
FIG. 5b is a side elevational view of the support block showing where the strain gauge is attached when the tensile experimental test is implemented to seek the strain distribution.

As a result, a relationship between the places ①, ②, ③ and an inequable strain distribution degree was found as shown in FIG. 5. Where the inequable strain distribution degree (%) is expressed by (|maximum strain (minimum strain)−average strain|)×100/(average strain) in which a greater one is selected when compared the absolute value |maximum strain| with the absolute value |minimum strain|.

The torque holding rate T (%) is expressed by the formula below.

$$T (\%)=(\text{a torque measured after undergoing a heat deteriorating experimental test or an endurance experimental test})\times 100/(\text{an initial torque})$$

It is to be observed that upon measuring the strain distribution, the number of the gauge pieces attached to the support block 20 can be variedly changed as desired.

Figure 7:
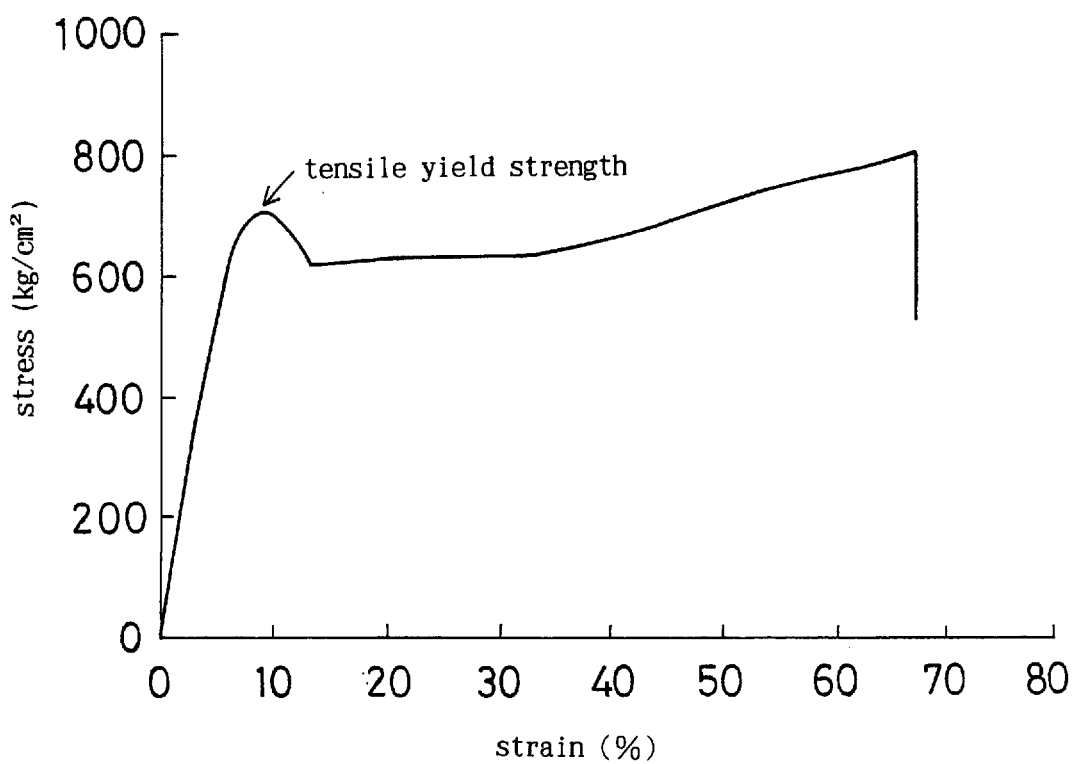
FIG. 7 is a stress-strain curve represented by a synthetic resin.

As an acceptable range of the inequable strain distribution degree, a margin of ±15% is adopted from the linear relationship as shown in FIG. 5. From this point of view, the inequable strain distribution degree within the synthetic resin is controlled to be 15% or less. This is to insure the torque holding rate of 80% or more as understood from a characteristic curve in FIG. 6. In order to avoid the support block 20 from deforming disproportionately greater, the measurements were done under the condition that the strain within the synthetic resin corresponds to 80% or less of a yield point (tensile yield strength) when the synthetic resin is subjected to a tensile experimental test as shown in FIG. 7.

Figure 8:
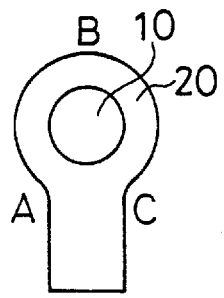
FIGS. 8~8e are schematic views showing various methods how to equalize the strain distribution within the synthetic resin.
Figure 8A:
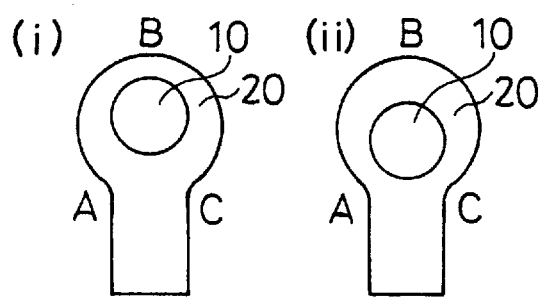
Figure 8B:
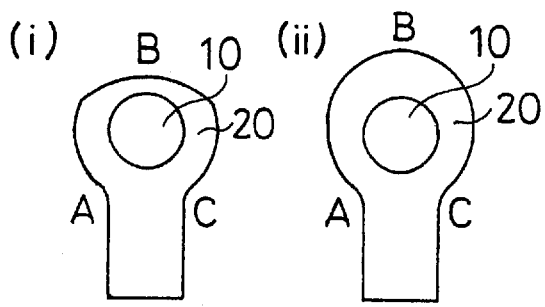
Figure 8C:
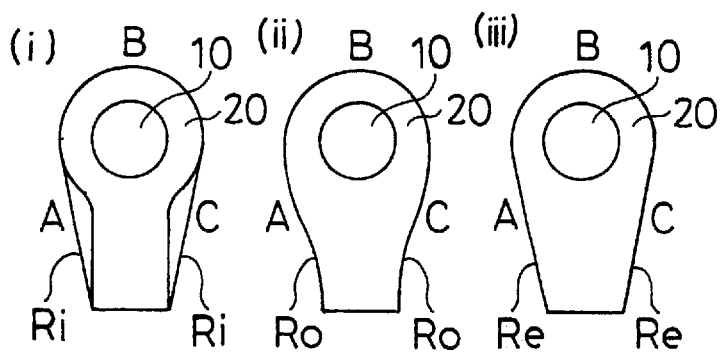
Figure 8E:
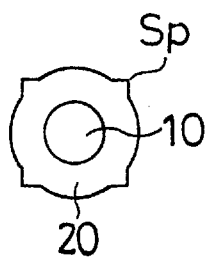

Means to control the inequable strain distribution degree under 15% or less are shown in FIGS. 8~8e. These means are contrived with an attention paid to the support block 20 formed in a keyhole-shaped configuration as shown in FIG. 8. In the support block 20 having the keyhole-shaped configuration, the strain tends to decrease at a circular head portion (B), and tends to increase at lateral side portions (A) and (C) so as to render the strain distribution inequable.

(1) In order to reduce the inequable stress distribution degree (15% or less) within the synthetic resin, the metallic shaft 10 is eccentrically located upward to thin the circular head portion (B) as shown at (i) in FIG. 8a. Otherwise, the metallic shaft 10 is eccentrically located downward to thicken the circular head portion (B) as shown at (ii) in FIG. 8a.

(2) The circular head portion (B) is thinned with the metallic shaft 10 located unchanged to remain concentrical as shown at (i) in FIG. 8b. Otherwise, the circular head portion (B) is thickened with the metallic shaft 10 located unchanged to remain concentrical as shown at (ii) in FIG. 8b.

(3) A rib (Ri) is provided on the lateral side portions (A) and (C) as shown at (i) in FIG. 8c. A mildly curved pad portion (Ro) and a linear-contoured pad portion (Re) are provided on the lateral side portions (A) and (C) respectively as shown at (ii) and (iii) in FIG. 8c.

Figure 8D:
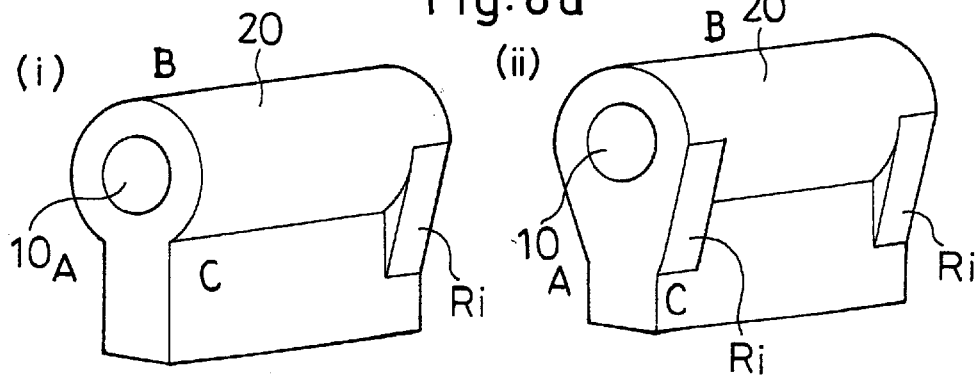

The ribs (Ri) can be provided on two corners of the lateral side portions (A) and (C) as shown at (i) in FIG. 8d. Otherwise four ribs (Ri) can be provided on four corners of the lateral side portions (A) and (C) as shown at (ii) in FIG. 8d.

(4) The support block 20 is formed so that its cross section is symmetrical in the up (right) and down (left) directions to equalize the strain distribution. Due to the support block 20 having a circular cross section as shown in FIG. 8e. In this instance, four jugs (Sp) are circumferentially provided on the support block 20 at regular intervals so as to lock the support block 20 from inadvertently rotating circumferentially.

Figure 9:
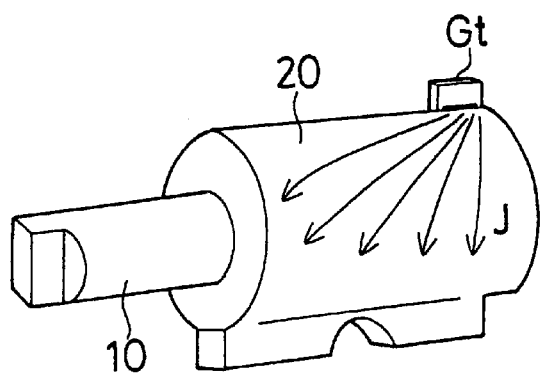
FIG. 9 is an example representing a single point injection gate used when injecting the synthetic resin around the metallic shaft.

In order to equalize the strain distribution, another means are adopted under the circumstances that the inequable strain distribution degree tends to increase in a single point injection gate (Gt) as shown in FIG. 9. This is because the single point injection gate (Gt) changes the solidified speed depending on places of the synthetic resin due to the varied flowing lengths running around the metallic shaft 10 as shown at an arrow (J) in FIG. 9.

Figure 9A:
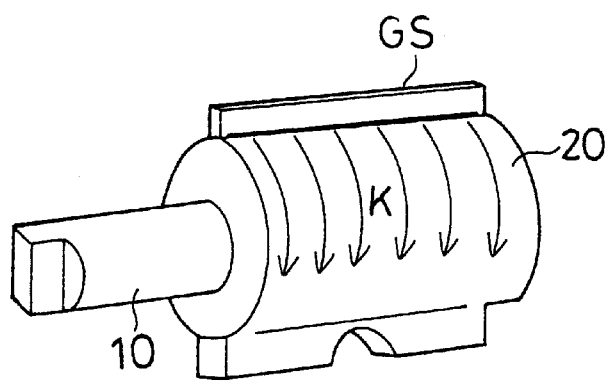
FIG. 9a is an example representing a film injection gate used when injecting the synthetic resin around the metallic shaft.

In FIG. 9a, a film injection gate (Gs) is provided instead of the single point injection gate (Gt). In order to substantially achieve the uniform solidified speed across the metallic shaft 10, the film injection gate (Gs) has an axial length dimension corresponding to that of the metallic shaft 10 to keep the flowing lengths substantially uniform as shown at an arrow (K) in FIG. 9a.

Figure 9B:
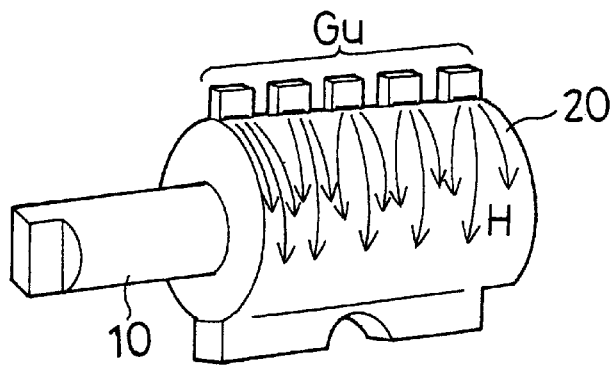
FIG. 9b is an example representing a multiple point injection gate used when injecting the synthetic resin around the metallic shaft.

In FIG. 9b, a multiple point injection gate (Gu) is adopted, gates are dispersed so that the flowing lengths from each of the dispersed gates are substantially the same as shown at an arrow (H) in FIG. 9b.

Another means is further adopted to equalize the strain distribution within the synthetic resin. This means is to deal the synthetic resin with a heat treatment after the synthetic resin was solidified. This means is adopted to relieve a directive effect induced within the synthetic resin when injected into the mold die. When the synthetic resin is solidified without relieving the directive effect, a molecular directive strain appears within the solidified synthetic resin. The heat treatment is done to relieve the molecular directive strain.

Figure 10:
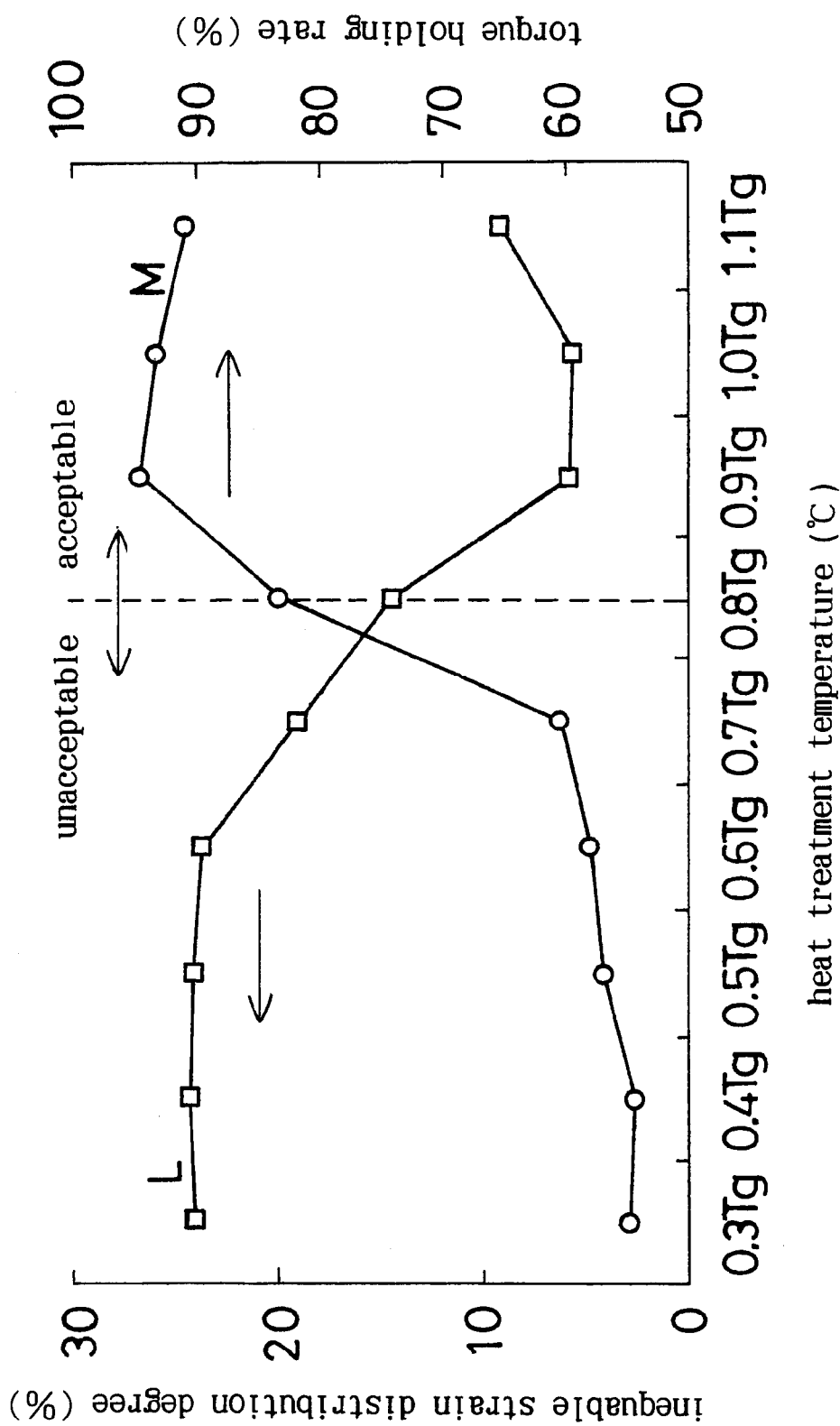
FIG. 10 is a characteristic curve showing how the torque holding rate and the inequable strain distribution degree changes depending on a heat treatment temperature.

In order to seek a heat treatment temperature so as to moderate the molecular directive strain, a relationship between the heat treatment temperature, the torque holding rate and the inequable strain distribution degree is determined as shown in FIG. 10. The relationship between the heat treatment temperature and the inequable strain distribution degree is labeled by legend L, and the relationship between the heat treatment temperature and the torque holding rate is labeled by legend M. Curves labeled by the legends L and M invert upside down when the heat treatment temperature is around 0.75×Tg (°C.). By setting the heat treatment temperature at 0.8×Tg (°C.) or higher, the inequable strain distribution degree is 15% or less with the torque holding rate at 80% or more. Where Tg (°C.) is a vitreous transformation temperature when the synthetic resin metamorphoses into a rubberized property.

Figure 11:
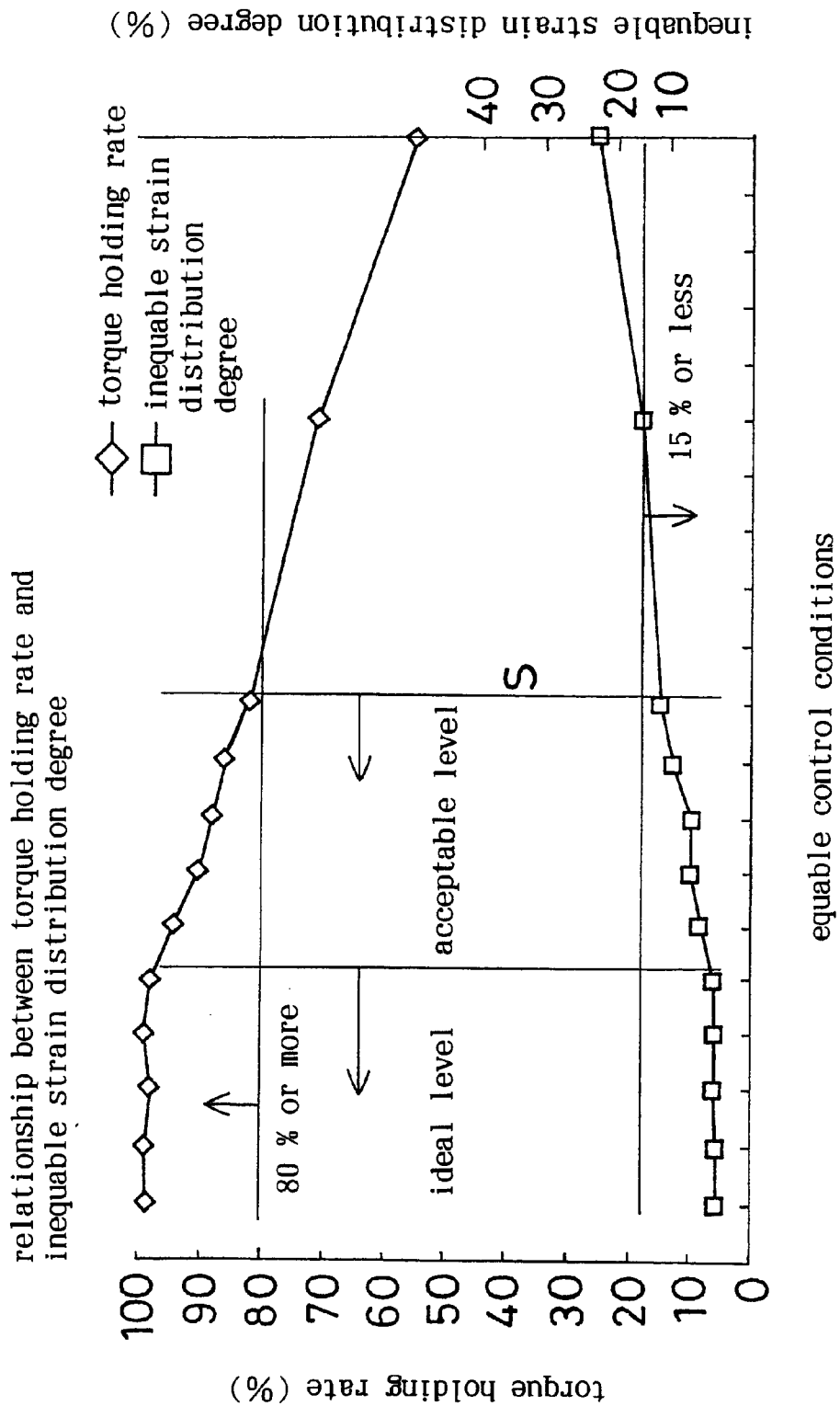
FIG. 11 is a characteristic curve showing how the torque holding rate and the inequable strain distribution degree changes depending on equable control conditions used when molding the synthetic resin.

An equable control means is adopted to equalize the strain distribution to determine a relationship between the inequable strain distribution degree and the torque holding rate by changing equable control conditions (molding conditions). The results are shown in FIG. 11 in which a left half region from a vertical line (S) teaches an acceptable level range that the inequable strain distribution degree is 15% or less with the torque holding rate at 80% or more. Within the acceptable level range, the synthetic resin flows equally around the metallic shaft to substantially equalize the strain distribution.

Upon equalizing the strain distribution within the synthetic resin of the support block 20, at least two means can be combined among the above-mentioned contrivances.

Namely, at least two items can be combined by selecting among the following items (a)~(d).

(a) Partly thickening or thinning the synthetic resin as shown in FIG. 8.

(b) Providing the film injection gate or providing the multiple point injection gate as shown in FIG. 9.
(c) Dealing with the heat treatment at temperature of 0.8×Tg (°C.) or higher as shown in FIG. 10.
(d) Determining the molding conditions to equally flowing the synthetic resin around the metallic shaft 10 due to the equable control means as shown in FIG. 11.

Thus, the inequable strain distribution degree within the synthetic resin is determined to be 15% or less so as to increase the torque holding rate by 80% or more to tightly engage the support block 20 with the metallic shaft 10. This eliminates variations on the frictional torque with no substantial stickslip phenomenon, abnormal noise and initial scratches accompanied when pivotally moving the support block 20 relative to the metallic shaft 10 so as to maintain the stable surface friction resistance with good endurance for a long period of time.

In the embodiment of the invention, the PAR (polyarylate) is used to the support block 20 with the diameter-increased section 11 as 5 mm in diameter and the diameter-reduced sections 12 as 4 mm in diameter.

The PAR (polyarylate) is one of heat-resistant non-crystallized synthetic resins with Tg as high as 190° C. The PAR (polyarylate) is suited to the support block 20 because the PAR (polyarylate) does not fluctuate its bending elasticity (GPa) significantly under the perimetric ambient temperature range in which business machines are usually used. With the general operating temperature range (e.g., −20 to +100° C.), the synthetic resins are selected in which Tg is 120° C. or higher.

On the other hand, the crystallized resins used in general has bending elasticity (GPa) fluctuating greatly under the operating temperature. When these crystallized resins are applied to the support block 20, the crystallized resins can not impart an appropriate frictional resistance with the metallic shaft 10 under the operating temperature fluctuating greatly. This is a reason the crystallized resins are not suited to the support block 20.

From the superior heat-resistant view point, the crystallized synthetic resins are selected from the so-called "super engineering plastic materials".

These crystallized synthetic resins are PAR (polyarylate), heat-resistant PC (polycarbonate), PPS (polyphenylene sulphide), PES (polyether sulfone), PEEK (polyether ether ketone) and the like.

When PTFE (polytetrafluoroethylene) is added by 3% by weight to the synthetic resin, the metallic shaft 10 was found to start pivoting smoothly, thereby further reducing an amount of dust worn between the metallic shaft 10 and the support block 20.

As an alternative, added to the above crystallized synthetic resin is an organic- or inorganic-based antifriction medium (within 15% by weight) such as fluoro-based resin, olefine-based resin, graphite, carbon fiber, talc, vitreous particles, molybdate bisulfide, potassium titanate or the like.

As another alternative, added to the synthetic resin is mineral, vitreous fiber, carbon fiber or the like within 40% by weight so as to provide a sufficient mechanical strength with the support block 20 when forming in integral with the metallic shaft 10.

It is to be noted that the outer surface of the metallic shaft 10 may be polished to impart a smaller surface roughness (Ra) therewith. However, when the surface roughness (Ra) is within the range of 0.15~0.35 μm, the metallic shaft 10 may be remained unpolished.

It is to be observed that instead of the lid plate 31 of the laptop note type personal computer 30, the frictional hinge device 1 may be applied to various lid plates for a copy machine, a porcelain toilet, an automobile hatch and hood, carrier side plates of trucks, windows of living houses and a keyboard of piano.

The frictional hinge device 1 can be applied to any article in which a lid plate is held at any desired angular positions by the surface friction resistance between the metallic shaft and the support block.

While there has been described what is at present thought to be preferred embodiments of the invention, it will be understood that modifications may be made therein and it is intended to cover in the appended claims all such modifications which fall within the scope of the invention.

What is claimed is:

1. A frictional hinge device comprising:
   a shaft member having a rotational axis as a rotational center;
   a support member which rotatably supports said shaft member;
   said support member being arranged so that said support member is rotatable relative to said shaft member, said support member being formed by a synthetic resin molded around said shaft member substantially in integral therewith to produce a surface frictional resistance between said support member and said shaft member due to a residual stress caused from a shrinkage allowance appeared when said synthetic resin is solidified; and
   an inequable strain distribution degree within said synthetic resin being 15% or less in order to equalize a strain distribution within said synthetic resin under the condition that a strain within said synthetic resin corresponds to 80% or less of a yield point when said synthetic resin is subjected to a tensile experimental test, wherein said inequable strain distribution degree (%) is expressed by (|maximum strain (minimum strain)−average strain|)×100/(average strain) in which a greater one is selected when compared said absolute value |maximum strain| with said absolute value |minimum strain|.

2. The frictional hinge device as recited in claim 1, wherein said synthetic resin is partly thickened or partly thinned in order to equalize said strain distribution within said synthetic resin.

3. The frictional hinge device as recited in claim 1, wherein a film injection gate or a multiple point injection gate is provided, the former of which flows said synthetic resin smoothly and the latter of which flows said synthetic resin dispersively when molded around said shaft member in order to equalize said strain distribution within said synthetic resin.

4. The frictional hinge device as recited in claim 1, wherein said synthetic resin is dealt with a heat treatment at temperature of 0.8×Tg (°C.) or higher after said synthetic resin is molded around said shaft member in order to equalize said strain distribution within said synthetic resin, where Tg (°C.) is a vitreous transformation temperature when said synthetic resin metamorphoses into a rubberized property.

5. The frictional hinge device as recited in claim 1, wherein an equable control means is provided to determine mold conditions so as to equally flow said synthetic resin around said metallic shaft in order to equalize said strain distribution within said synthetic resin.

6. The frictional hinge device as recited in claim 1, wherein a least two means are combined among following items (a)~(e) in order to equalize said strain distribution within said synthetic resin.

(a) partly thickening or partly thinning said synthetic resin,
   (b) providing a film injection gate to flow said synthetic resin smoothly when molded around said shaft member,
   (c) providing a multiple point injection gate to flow said synthetic resin dispersively when molded around said shaft member,
   (d) dealing with a heat treatment at a temperature of 0.8×Tg (°C.) or higher after said synthetic resin is molded around said shaft member, and
   (e) determining molding conditions to equally flowing said synthetic resin around said shaft member due to an equable control means.

7. A portable business machine in which the frictional hinge device as recited in any one of claims 1–6 is used to pivotably support a display thereof so as to hold said display at desired angular positions.

* * * * *